June 24, 1930.  D. P. OGDEN  1,768,486
CONTINUOUS CAR TUNNEL FURNACE AND METHOD OF OPERATING THE SAME
Filed Nov. 12, 1924    7 Sheets-Sheet 1

June 24, 1930. D. P. OGDEN 1,768,486
CONTINUOUS CAR TUNNEL FURNACE AND METHOD OF OPERATING THE SAME
Filed Nov. 12, 1924 7 Sheets-Sheet 2

June 24, 1930. D. P. OGDEN 1,768,486
CONTINUOUS CAR TUNNEL FURNACE AND METHOD OF OPERATING THE SAME
Filed Nov. 12, 1924 7 Sheets-Sheet 3

Inventor,
Dana P. Ogden

Patented June 24, 1930

1,768,486

UNITED STATES PATENT OFFICE

DANA P. OGDEN, OF OTTAWA, ILLINOIS, ASSIGNOR OF ONE-HALF TO ERMIN F. PLUMB, OF STREATOR, ILLINOIS

CONTINUOUS-CAR-TUNNEL FURNACE AND METHOD OF OPERATING THE SAME

Application filed November 12, 1924. Serial No. 749,430.

This invention relates to continuous car tunnel furnaces, that is, furnaces wherein the material or articles to be treated are supported on cars which are caused to move progressively through the furnace, the cars following one after the other in order to form a substantially continuous material or article-carrying platform.

One of the objects of this invention is to provide a construction wherein the material or articles to be treated may be subjected quite uniformly to the same treatment both as to temperature and atmospheric quality throughout any lateral section of the tunnel furnace, together with means by which such uniform treatment may be insured.

Another object is to provide a construction whereby the temperature and atmospheric conditions at various portions of the path of the material or articles through the furnace may be regulated.

Still another object is to provide a construction wherein the heat will be economically used, the heat given off by the material or articles during the latter portion of the treatment being employed to heat other material or articles in the earlier treating stages.

Further the invention contemplates various arrangements and constructional features for carrying out or furthering the objects hereinbefore enumerated, the increasing of the general efficiency of the furnace, and for attaining other objects as will later appear.

While not restricted to such use the invention will be described in connection with an embodiment particularly designed for firing ceramic material such as brick.

For a more complete understanding of this invention, reference may be had to the accompanying drawings in which Figures 1 and 1ª represent a horizontal section through the furnace, Figure 1 representing that half including the entrance for the cars supporting material to be treated and the exhaust fan for the air and gases, and Figure 1ª representing the other half including the exit for the cars and the entrance for the air and gases.

Figure 12 is a perspective of a fan shaft opening plug.

Figure 1:
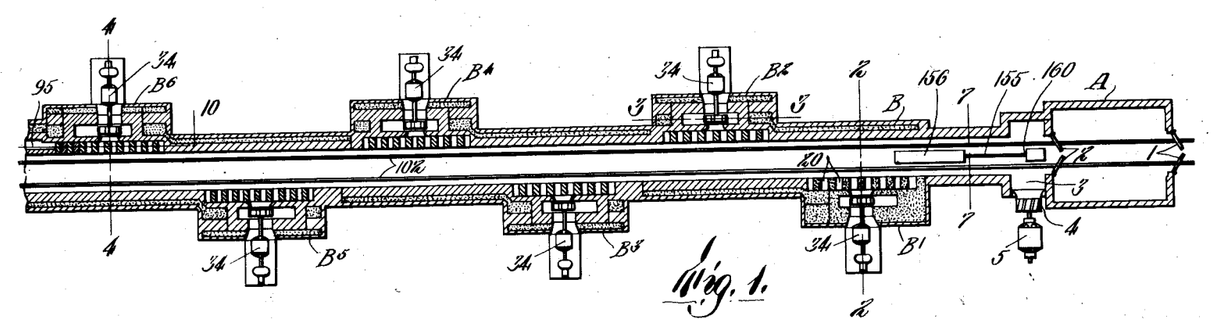
Figure 1A:
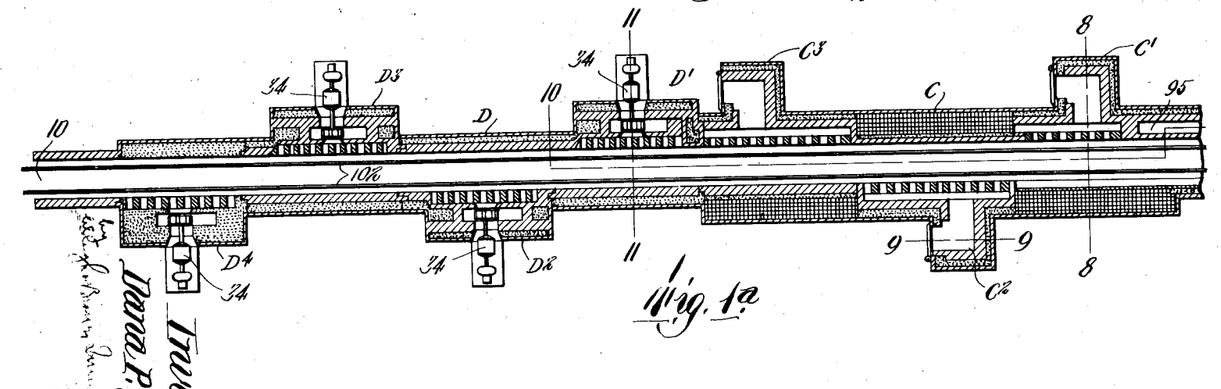

Referring first to Figures 1 and 1ª, it will be seen that the heat-treating mechanism of this invention consists of a tunnel furnace comprising a relatively long chamber having at one end, as at the right in Figure 1, an air lock A having spaced sets of doors 1 and 2 so arranged that cars may be placed within the lock, the doors 1 being open and the doors 2 closed, and after the doors 1 have been closed and the doors 2 opened, the cars may be moved further within the tunnel. Within the inner doors 2 the tunnel is shown as provided with a lateral opening 3 having an exhaust fan 4 therein operated by a motor 5 for drawing gases out from the tunnel. This exhaust fan is situated in an end portion B of the tunnel which may be termed the heating zone which extends from the inner doors 2 to an intermediate section C shown in Figure 1a. As shown this section is provided with three combustion furnaces $C^1$, $C^2$, $C^3$. Beyond this section C, which may be termed the hot section, is a section D, which may be termed the cooling section, this section extending to the opposite end of the tunnel furnace from the air lock A and being open at its outer end as at 10. A stack or chimney may be substituted for the exhaust fan where conditions are such that the draft created thereby is sufficient.

Figure 8:
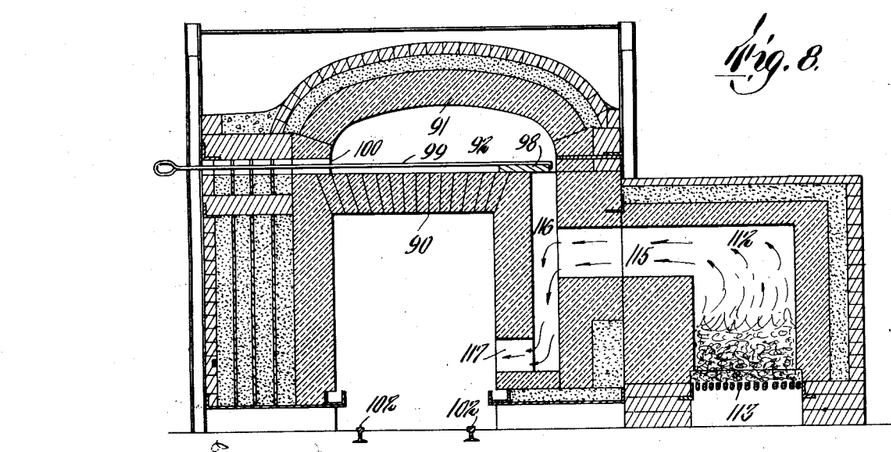
Figures 8 and 9 are detail sections on lines 8—8 and 9—9, respectively of Figure 1ª.
Figure 9:
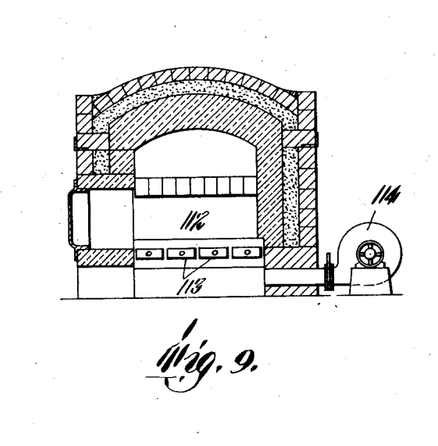

Referring for a moment to Figures 8 and 9, it will be seen that each of the furnace sections $C^1$, $C^2$ and $C^3$ is situated in a lateral extension from the main body of the furnace and is provided with a fire box 112, which when coal is to be used for fuel, has a grate 113 and is preferably supplied with forced draft as through a blower 114 so that the combustion products may be under sufficient pressure to flow into the tunnel. The products of combustion of each combustion furnace pass into the main chamber of the tunnel through the passage 115 and downwardly through a combustion chamber 116 and into the lower portion of the tunnel through a series of passages 117. As the hot gases are delivered at the lower portion of the tunnel in this hot zone it is evident that they will pass upwardly toward the roof thereof, the cooler gases falling to the lower portion thereof, the entry of the gases at this point, therefore, tending to produce a circulation of the hotter and cooler gases and tending to maintain the temperature of this zone at a fairly constant point.

In order that the more important features of this invention may be readily understood we will assume for the moment that the material to be treated comprises bricks which are to be carried through the tunnel, being introduced therein through the air lock and discharged from the opposite open end thereof, and that the exhaust fan 3 causes a passage of air and gases from the open material-discharge end of the tunnel toward the air lock in the opposite direction to the progress of the bricks through the tunnel, but without any means for circulating the air and gases in the tunnel furnace from top to bottom except that which may be produced by the admission of the products of combustion from the furnaces into the lower portion of the tunnel at the hot zone.

The clay from which bricks are made may consist essentially of 4% to 8% of water, 1½% to 3% of carbonaceous matter, 10% to 12% of iron oxide, and the balance of silica, alumina and varying amounts of various other oxides. When these bricks are heated up to a temperature of about 900° the water in the pores and the chemically combined water is driven off, this requiring the addition of heat to the material. At temperatures between 900° F. to 1600° F., the carbonaceous matter is oxidized by the action of the furnace gases which obviously must contain oxygen in sufficient amounts, this reaction being exothermic. This gain of heat energy, however, is not a net gain because there are probably endothermic reactions going on simultaneously, but the net result is to give off heat. At temperatures between 1600° F. and 2000° F. the body of the material gradually becomes vitrified and thus more dense. This vitrification is essentially a partial solution wherein certain of the clay particles having the lowest fusion temperatures become at least semi-liquid and move into the voids left by the original evacuation of water and the driving off of volatile matter, such that the molecular forces of the entire mass cause the body of the material to shrink in size about 7% to 8% linear in the case of the material having the composition hereinbefore mentioned at which point the maximum density is reached. The chemical reactions are then complete and nothing more remains to be done but to cool the ware.

The necessary operations to be effected may be enumerated as follows:

1. The ware must be conveyed through its various operations and its treatment and handling must be such that it will stay on the cars.

2. It must have a great amount of heat added to it up to temperatures around 900 degrees F.

3. It must be kept in an oxidizing atmosphere while it is being heated from 900 degrees F. to 1600 degrees F. or higher, and temperature rise during this period must be under control.

4. It must be heated to 2000 degrees F.

5. It must be cooled and the heat so obtained used efficiently.

6. Fuel must be burned and the combustion products used to accomplish what heating cannot be effected with the heat recovered from the cooling ware.

7. The furnace structure and cars must resist the mechanical and thermal forces tending to disintegrate them.

Assuming now that the tunnel furnace is completely filled from end to end with cars having bricks thereon, the cars in the cooling zone having already passed through the hot zone and the bricks thereon thus being at a relatively high temperature adjacent to the hot zone and cooler toward the discharge opening, the air being drawn through the tunnel from the open end comes in contact with the relatively hot bricks and becomes hotter and hotter as it approaches the hot zone. The air is drawn in uniformly over the entire cross section of setting of bricks on the cars and as it passes back into the tunnel a part of it becomes heated, whereas the remainder, together with the unavoidable leakage, is not so hot. Since under the conditions assumed there is nothing to prevent such action, the hotter and less dense air moves up to the top of the tunnel, and the cool air lies along the floor thereof. The effect of this is to cool the bottom portion of the cars but not the top portion. The bricks as discharged from the open mouth of the tunnel, therefore, will be hot adjacent to the top and cool adjacent to the car floor so that much of the heat which might be utilized to advantage is withdrawn with the bricks and is therefore lost. When the longitudinal moving body of air reaches the hot zone, the highly heated combustion gases which are discharged into the tunnel raise the temperature of this current higher on the bottom than on the top and consequently a circulation is set up laterally within the tunnel. As soon as this mixture of longitudinally moving air and gases has moved out from the hot zone into the heating zone far enough for the circulation set up at the fire boxes to become negligible, the hotter gases again rise to the top of the tunnel and the cooler gases flow along the bottom. It is in this portion of the tunnel that the most detrimental effects from this unequal heat distribution will be experienced. The cars of bricks entering the tunnel through the air lock contain water in the pores of the bricks and also chemically combined water which must be driven off, and consequently a considerable amount of heat is necessary. The hot current of air along the top of the tunnel in the heating zone will do this to the top courses of bricks satisfactorily, but the bottom courses of bricks are not so thoroughly heated since the air and gases coming in contact therewith are considerably cooler than those at the top of the tunnel and the water may not be thoroughly removed. At the comparatively low temperatures adjacent to the air lock heat transferred by radiation is negligible. As the car passes through the heating zone toward the hot zone where the carbonaceous material in the clay should be oxidized, the top of the setting is dry and the bottom is relatively cold and wet. Furthermore, the top of the setting is moving into a region of relatively hot gases and tunnel walls, whereas the bottom of the setting is moving into a region of cooler gases and walls. The top of the setting, therefore, begins early to go through its exothermic reactions of oxidization and is apt to become overheated. The bottom of the setting is still so relatively cold and full of moisture that unless the motion of the ware through the tunnel is extremely slow, it has no chance to reach a sufficiently high temperature to complete the oxidization process and in fact would probably contain considerable water by the time it reaches the hot zone. In the hot zone the combustion gases are discharged into the lower part of the tunnel and would strike directly against the relatively cold and unoxidized material. The ware on the outside bottom of the car would then be heated so rapidly by the combustion gases that there would not be sufficient time for complete oxidization before the commencement of vitrification. The surface portions of the bricks would thus become viscous and impervious to the passage of gases and the semi-molten ware would be swelled out of shape by the pressure of gases resulting from the oxidation occurring at their centers. If the passage of the ware were slower and the oxidation were accomplished successfully the outside lower courses immediately in front of the fire box ports would be liable to shrink or even be squashed down much faster than the ware on the bottom center of the car. Either of these phenomena carried to extreme would cause the setting to roll and tumble down against the tunnel walls, ruining the product and causing such a wreck that the heat-treating mechanism would become inoperative.

To cool the ware in the cooling zone about four to six times as much air is required as is needed for the combustion of the fuel so that a considerable flow of air must be made to take place lengthwise of the tunnel. As this air enters the tunnel comparatively cold and is colder than the bricks and the tunnel walls with which it comes into contact, it enters the hot zone at about 1600° F. whereas to be of use in this zone it must be raised to about 2000° F. which must be done by means of the combustion furnaces. Thus as the gases from the furnaces cause a very considerable rise in temperature in the hot zone, which under the assumed condition would be more pronounced at the top of the tunnel at the adjacent end of the heating zone, the tendency for the atmosphere in this portion of the heating zone to be raised to an excessively high temperature from the exothermic reactions would be much increased.

An important feature of the present invention, therefore, relates to means by which the air and gases in the heating and cooling zones B and D of the tunnel furnace are caused to be circulated from top to bottom, that is, laterally of the direction of flow through the tunnel, so that the difficulties hereinbefore mentioned inherent in heat-treating mechanism of this type where the hotter air and gases are allowed to remain near the upper portion thereof, are avoided. This lateral circulation also acts to increase the velocity of the air or other gases over the surface of the bricks above that produced by the longitudinal travel thereof through the tunnel, thus increasing the effectiveness of the heat interchange.

From the description hereinbefore given it will be evident that in those portions of the heating and cooling zones closely adjacent to the hot zone the temperatures of the gases and air which must be circulated are high, even though somewhat lower than in the hot zone, so that the difficulties of establishing the lateral circulation of the air and gases are greater than if the temperatures were lower. In practice, however, it has been found possible to circulate and mix these gases mechanically by impelling means such as fans of heat-resistant alloys with which the gases may come directly into contact, it being necessary, however, to protect the motors or other operating mechanisms from such high temperatures. As shown, therefore, in Figures 1 and 1ᵃ, the heating zone comprises six sections each of which is provided with a lateral extension as $B^1$, $B^2$, $B^3$, $B^4$, $B^5$, and $B^6$, the extensions being arranged alternately on opposite sides of the tunnel, and the cooling zone comprises four such lateral extensions $D^1$, $D^2$, $D^3$ and $D^4$. In each of these extensions is mounted a fan of heat-resisting alloy which is arranged to draw the air and gases from the lower portion of the tunnel and discharge them into the upper portion. The stream of air and gases drawn from the tunnel by each fan is agitated and thoroughly mixed by the revolving fan blades so that the gases which are discharged again into the tunnel are completely blended. This helps to maintain the atmosphere at any point in the tunnel substantially homogeneous and thus insures a more uniform action of the atmosphere on the ware. This feature is especially important in that portion of the tunnel in which the material of the ware undergoes oxidization.

Figure 2:
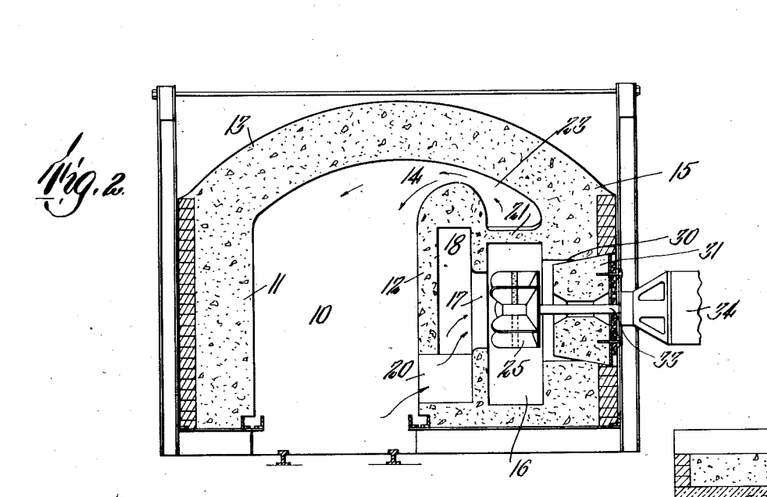
Figure 2 is a section on line 2—2 of Figure 1.
Figure 3:
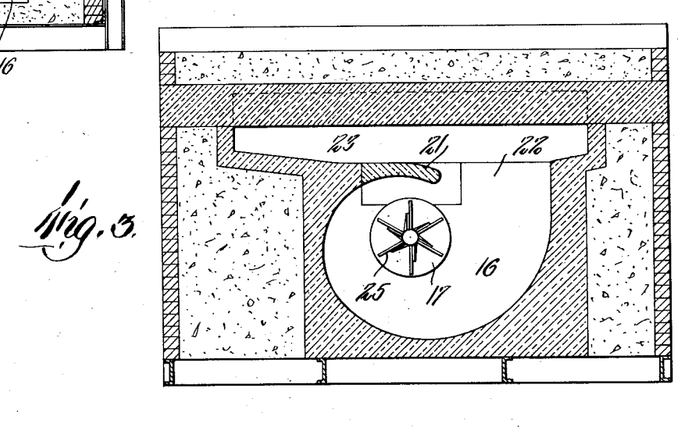
Figure 3 is a section on line 3—3 of Figure 1.

Referring now more particularly to Figures 2 and 3, which represent sections through the furnace at the lateral extensions $B^1$ and $B^2$, respectively, it will be seen that the furnace at these sections comprises a tunnel portion 10 bounded by a wall 11 on one side and a hollow wall 12 on the opposite side, the top of the tunnel being formed by an arch 13 extending from the upper end of the wall 11 over the top of the wall 12 leaving a space 14 therebetween. The arched top 13 extends over the extensions $B^1$ and $B^2$ and rests on or merges with the outer wall 15 thereof. Between the walls 15 and 12 is a fan scroll 16 which communicates centrally through an opening 17 with a hollow portion 18 in the wall 12, this hollow portion communicating through a series of ports 20 (see Figures 1 and 2) with the lower portion of the tunnel 10. The fan scroll is provided with a top wall 21 extending partly thereover (see Figure 3) which defines with the opposite portion of the scroll a passage 22 communicating with a chamber 23 extending between the lower face of the arch 13 and the upper face of the wall 12, this chamber communicating with the upper portion of the tunnel chamber 10 through the narrow opening 14. Within the fan scroll 16 is positioned a centrifugal fan 25 so formed as to draw air and gases through the ports 20, the chamber 18 and the opening 17 into the fan scroll and discharge the gases through the opening 22 into the chamber 23 and then through the narrow passage 14 into the upper portion of the tunnel 10. By this means a circulation of the gases in the tunnel at this cross sectional portion is maintained, drawing them from the upper portion of the tunnel downwardly into contact with the material which may be therein and out from the lower portion thereof into and through the fan scroll, and introducing them into the upper portion of the tunnel through the opening 14. As the series of ports 20 in the lower portion of the tunnel is extended along the length of the tunnel for a considerable distance the gases are taken into the fan scroll at a reasonably low velocity and are introduced into the tunnel at its upper portion over an extended length so that no sudden eddy currents are produced and the air and gases are caused to be brought from the top to the bottom of the tunnel at a given lengthwise portion in the tunnel to substantially uniform temperature.

It will be noted that in Figure 2 the tunnel wall is shown as composed primarily of concrete, this being amply sufficient to withstand the heat to which this portion of the tunnel is subjected. However, as the hot zone C is approached the temperatures to be handled rise and it is therefore necessary to modify the tunnel wall construction to properly withstand the temperatures. For this reason the fan scrolls and the interior portions of the tunnel subjected to the hot gases may be formed of fire brick or suitable refractory material and with suitable nonconducting jackets where this is found necessary or desirable. In Figure 3 the fan scroll is shown as formed of refractory material and as indicated in Figure 1 the fan scrolls of the lateral extensions B², B³, B⁴, B⁵ and B⁶ are so made.

Each fan is arranged to be inserted in position in the scroll through a conical opening 30 of sufficient size to permit the passage of the fan therethrough, this opening being closed off by means of a conical plug 31 seated therein which is provided with a central opening 32 for the passage of a fan-actuating shaft 33, and outwardly of this plug is positioned a suitable motor 34 for driving the fan. A plug for closing one of the conical openings is shown in detail in Figure 12. As the temperatures of the air and gases handled is high in those sections near the hot zone these plugs should be formed of material which is able to withstand these temperatures. Material which has been found satisfactory for the purpose is a mixture of kieselguhr or diatomaceous earth aggregate with sufficient Portland cement to form a suitable solid block. This mixture is very light and is a good heat insulator and is able to withstand temperatures up to approximately 1700° F. without difficulty. As shown the plug is formed in three segmental sections 31ᵃ, 31ᵇ and 31ᶜ, which may be held together by latches indicated at 40 so that the sections may be inserted and removed as a unit after having been assembled about the shaft 33. The opening 32 for this fan shaft is somewhat larger than the shaft and in order to effectively seal off the space between the shaft and the interior walls of this opening, it has been found desirable to employ a felt disk 41 overlying the outer face of the sections and closely engaging the shaft 33. As the action of the fan tends to draw air inwardly between the shaft and the plug, the felt disk is subjected only to air at atmospheric temperatures outside the tunnel, it being sufficiently far away from the fan scroll to suffer no injury from the high temperature gases therein. As shown the felt disk may be fixed in position against the outer face of the plug, which preferably is provided with a sectional metallic ring facing 42, by the latch mechanism. This construction facilitates the quick removal of an entire fan assembly and replacement by another similar assembly without interrupting the operation of the kiln as a whole. In view of the severe conditions of the high temperature under which the fans continuously operate, and the desirability of continuous uninterrupted operation of the kiln, this feature of construction is of great practical importance.

Figures 21, 22, 23:
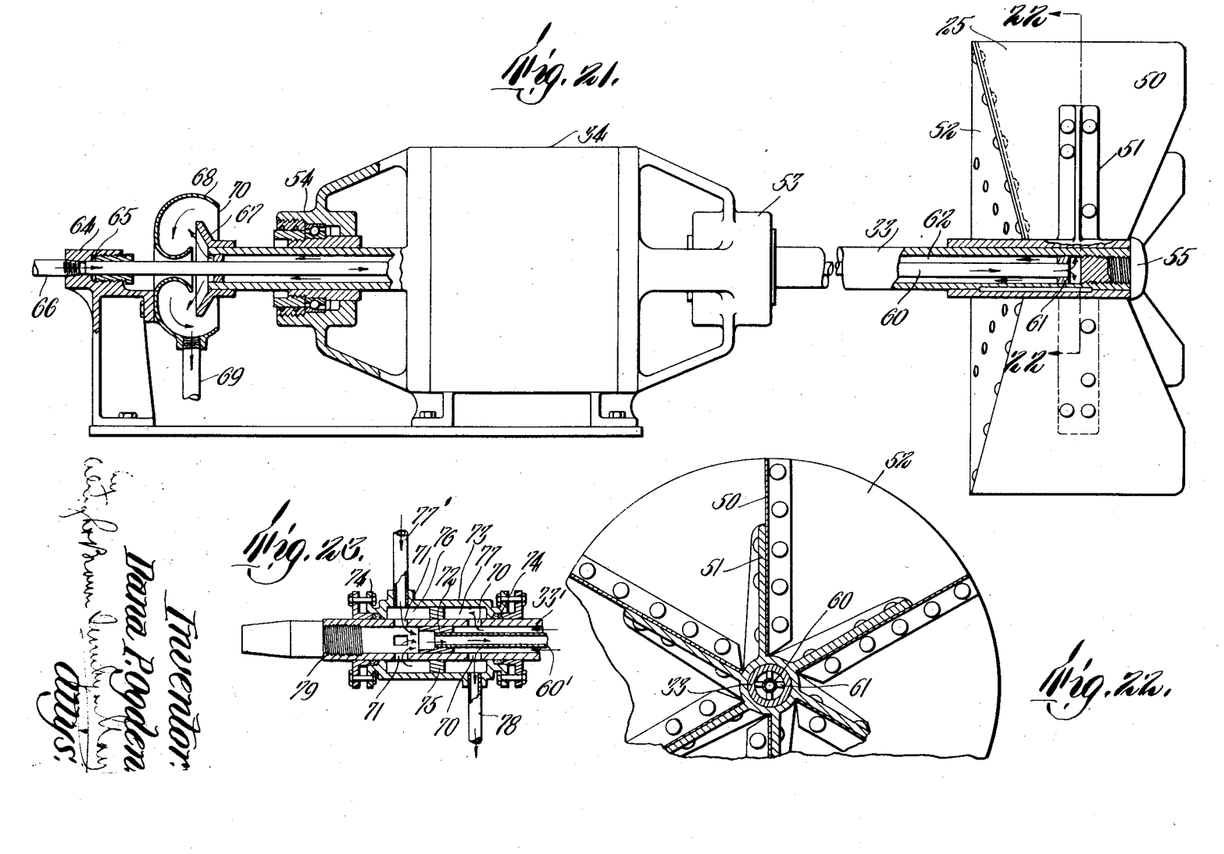
Figure 21 is a view partly in section of a tunnel fan mechanism.
Figure 22 is a section on line 22—22 of Figure 21.
Figure 23 is a modified construction for permitting water circulation through the fan shaft.

Figures 21 and 23 show details of the fan and its driving mechanism. Referring to these figures it will be seen that the fan comprises a plurality of radially extending blades 50 of heat-resisting material, such as the high temperature resistant alloys hereinbefore referred to, these blades 50 being carried by a spider 51 fixed to the end of a tubular shaft 33. At 52 is indicated an end plate for the fan fixed to the blades 50 at their outer edges. The tubular shaft 33 extending through the opening in the plug 31 forms the shaft of the motor 34. As shown it is supported in widely spaced bearings 53 and 54 at opposite ends of the motor casing. The inner end of the shaft 33 is closed off by a headed plug 55. While the fan blades are capable of withstanding the high temperatures, it is necessary to cool the driving shaft. For this purpose a pipe 60 is shown as extended through the interior of the shaft 33, terminating back of the plug 55 and spaced from the interior walls of the shaft 33 by spacers 61, so that a passage is formed from the interior of the pipe 60 into the shaft 33 back of the plug and communicating with the annular passage 62 between the outer wall of the pipe 60 and the inner wall of the shaft 33.

As shown in Figure 21 the pipe 60 extends through the shaft 33 and is supported in a bearing 64 beyond the outer end thereof, packed as at 65 so that water may be supplied to its interior through the stationary supply pipe 66. After passing through this pipe and returning within the shaft 33 outside of this pipe it is shown as being directed by a substantially conical baffle 67 into the interior of an annular chamber 68 from which it may escape through a drain 69. As shown the inner face of the annular chamber is open as at 70 to permit inspection so that it may be readily determined whether a proper flow of cold water is taking place through the shaft.

In case it is desired, however, a closed circulation for the water which may be more positive in its action may be provided as shown for example in Figure 23. In this construction the fan shaft indicated at 33' is provided with spaced series of ports 70 and 71, the supply pipe 60' terminating in a hollow plug 72 positioned between these ports and closing off communication therebetween within the shaft. Outwardly of the shaft 33' is fixed to rotate thereon a hollow shell 73 having glands 74 at opposite ends to insure a water tight joint between it and the exterior of the shaft 33'. This shell defines with the shaft 33' a chamber divided into two longitudinal portions by a ring 75, one of these portions, as at 76, communicating through the port 71 with the interior of the pipe 60' and the other at 77 communicating through the ports 70 with a space between the pipe 60' and the interior wall of the shaft 33'. A water supply pipe 77' communicates with the chamber 76 and a waste pipe 78 communicates with the chamber 77. The outer end of the tubular shaft 33' is shown as closed off by a plug 79. Cooling water supplied to the pipe 77' thus passes into the pipe 60' and after escaping at the inner end of this pipe flows backwardly around this pipe and inside of the hollow shaft 33' and escapes from the pipe 78. This arrangement of course requires packed joints and with it it is not so readily determined whether the flow of water is satisfactory, but it is more positive in its action and is not liable to splash.

It will be noted that the stiffness of the hollow shaft is relied upon to properly support the fan, there being no bearings in the fan scroll or portions of the tunnel walls for supporting the shaft so that there is no problem of lubrication present for those portions subjected to the hot gases.

Where the ports 20 through which the gases are drawn from the lower portion of the tunnel are practically co-extensive with the discharge passage 14 lengthwise of the tunnel, it is evident that the flow of gases as produced by the fans 25 will have no tendency to create a flow longitudinally of the tunnel, but by closing off more or less of either the ports 20 or the passage 14, or both, it is evident that the flow of gases caused by the fan may be utilized to effect a flow of the gases longitudinally of the tunnel in one or the other direction as may be desired quite independently of any general flow through the tunnel such as may be produced by the exhaust fan 3.

Figures 4, 5, 6, 7:
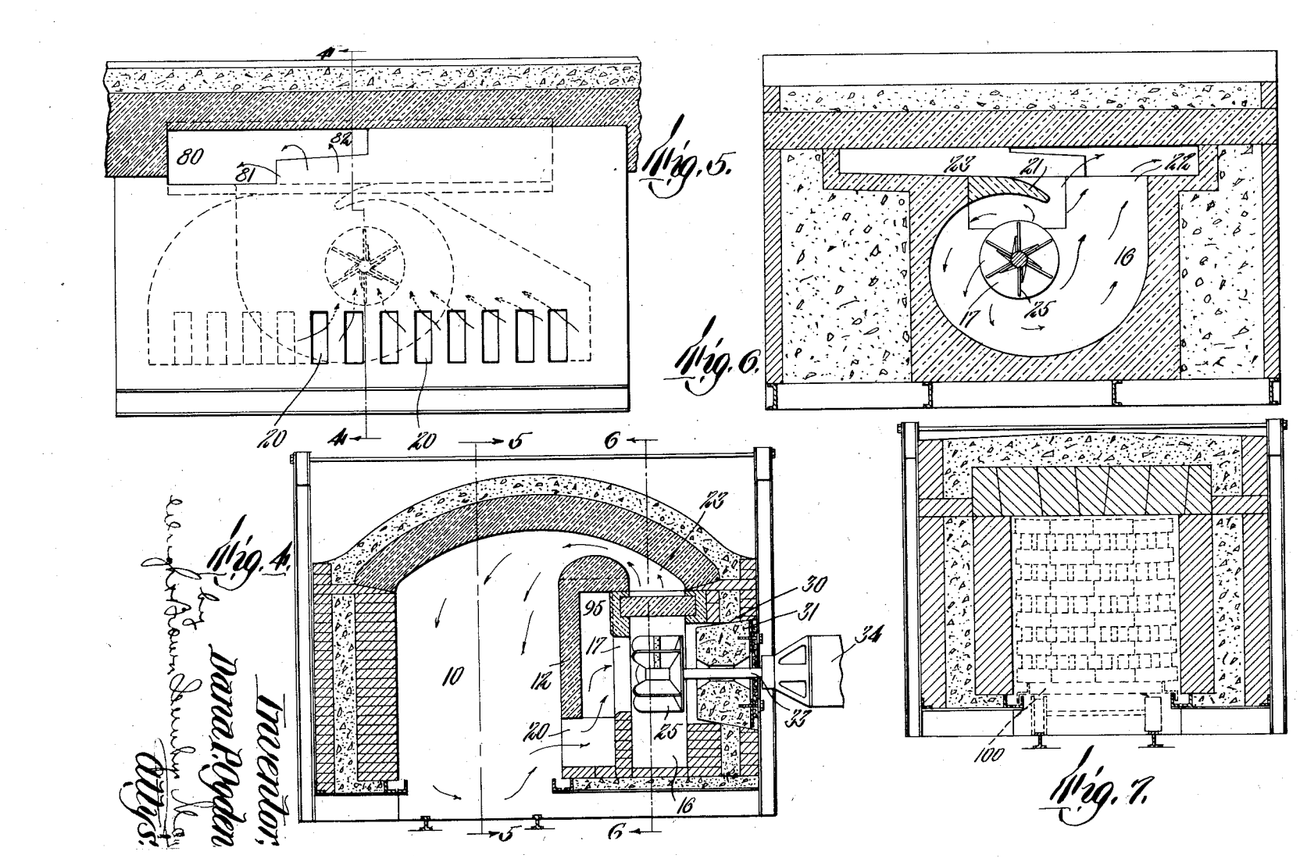
Figure 4 represents a lateral section substantially on line 4—4 of Figures 1 and 5.
Figure 5 is a section on line 5—5 of Figure 4.
Figure 6 is a section on line 6—6 of Figure 4.
Figure 7 is a section on line 7—7 of Figure 1.

As shown this possibility is made use of in the present embodiment of the invention at the extension $B^6$ as shown more particularly in Figures 4, 5 and 6. Referring to these figures it will be noted that several of the ports 20 as indicated in dotted lines in Figure 5 at the end toward the hot zone C have been closed off, and that the fan scroll discharge opening into the tunnel has been modified in shape. The gases discharge into the chamber 23 in the same manner as indicated in Figure 2, but the top of the wall 12 in section $B^6$ has been modified to produce a stepped discharge opening 80 adjacent to the opposite end of the extension from the open ports 20, the wider portion of this opening as 81 being further toward this end than the narrower portion 82. The result of this construction is to draw the flow of gases from the lower portion of the tunnel at one portion of its length at a distance from the hot zone and to discharge these gases into the tunnel at another portion of its length nearer the hot zone, thus creating a longitudinal movement of the gases through the tunnel toward the air lock entirely independently of the flow induced by the exhaust fan 3. Such an unbalancing of the entrance and discharge of gases to and from the tunnel is found desirable in the embodiment shown in order to produce the desired movements of the gases in the tunnel and it is of course evident that where conditions make it desirable to produce other distributions of gases, they may be effected by modifying in a proper manner the intake or outlet, or both, of one or more of the circulating fans until the desired distribution and flow is established.

The construction of the lateral extensions and circulating fans in the cooling section such as shown at $D^2$, $D^3$ and $D^4$ may be substantially the same as has been described in connection with the circulating fans of sections $B^1$ to $B^6$ inclusive. As shown they are similar to the sections $B^1$ to $B^5$. The construction of section $D'$, however, has been modified for a purpose which will presently appear.

Figure 10:
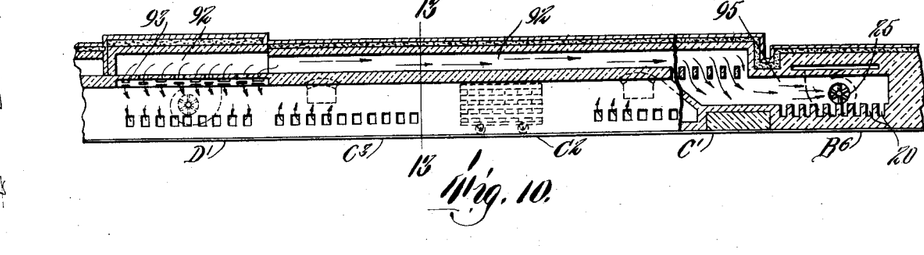
Figure 10 represents a vertical section along the lines 10—10 of Figures 1 and 1ª.
Figures 11, 13, 14, 15, 16:
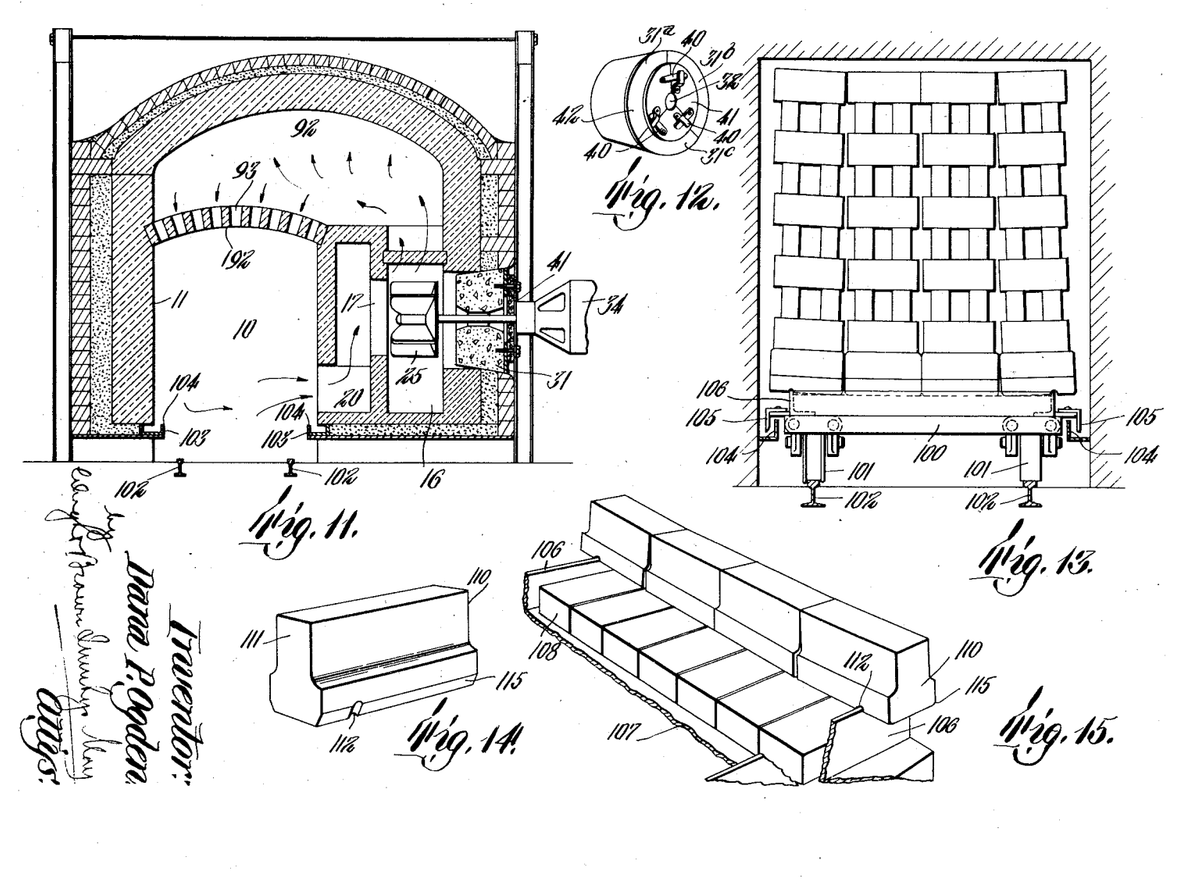
Figure 11 is a section on line 11—11 of Figure 1ª.
Figure 13 is a section on line 13—13 of Figure 10.
Figure 14 is a perspective of a floor block for a car.
Figure 15 is a fragmentary perspective showing the car flooring partly in position.
Figures 16 and 17 are fragmentary elevations showing a car pusher element in different positions.

Referring again to Figures 8 and 10, it will be seen that the top wall or roof of the tunnel furnace at the hot zone comprises a substantially flat arch 90 which is surmounted by an arch 91, the space between the arches forming a bypass 92 extending the length of the hot section C and also over the first cooling zone $D'$. As shown in Figures 10 and 11 the inner roof of the tunnel furnace at the section $D'$ is formed as an arch 192 having a series of ports 93 therethrough which establishes a somewhat restricted communication between the upper portion of the tunnel at this section and the bypass 92. It will also be seen by reference to Figure 11 that the air and gases taken in from the lower portion of the tunnel through the ports 20 by the fan in section $D'$ is discharged directly into the bypass 92 instead of being returned directly into the tunnel as in the fan extensions hereinbefore described. Due to the restricted passage through the ports 93 there is thus produced by the fan in this section a pressure of gases in the bypass in excess of that in the tunnel, which creates a flow of the gases lengthwise of the bypass through a passage 95 to the intake of the circulating fan in section $B^6$ (Figures 4 and 10). By this means air drawn in from the open end of the tunnel and which has been heated by its passage over the material heated while passing through the heating and hot zones is forced into the bypass above the hot zone and discharged into the tunnel at the last section of the heating zone in advance of the entrance thereto of the products of combustion. By this means preheated air is brought into contact with the material in the heating zone maintaining an oxidizing atmosphere therein to insure the completion of exothermic reactions necessary before the vitrification of the ware takes place. Not only is the heated air in the bypass made use of to produce an oxidizing atmosphere in the latter portion of the heating zone, but it may also be used to aid in combustion at the hot zone.

For this purpose the combustion chambers 116 are shown as opening at their upper ends into the bypass and due to the pressure of the air in the bypass being in excess of that in the tunnel air from the bypass tends to flow into the combustion chamber to unite with the hot gases therein and insure more complete combustion.

In order that the amount of air passing into the combustion chambers may be regulated as desired openings leading into the combustion chamber may be more or less closed by means of dampers. As shown these dampers consist of fire brick slabs 98 (see Figure 8) resting on the lower wall of the bypass and which may be slid to more or less completely cover the upper ends of the combustion chamber as by means of a hooked rod 99, which may be inserted into the bypass through a small passage 100 extending through the wall of the furnace, the passage being normally closed and sealed by any suitable means at the outer face of the furnace when it is not desired to move the slabs 98, of course, the rod 99 being removed except when adjustment of these slabs is desired.

As shown the hot zone is heated by combustion from a solid fuel furnace. It might, of course, be heated by liquid or gaseous fuel in which cases the fuel might be introduced directly into the combustion chamber, or if desired a combination of solid and liquid or gaseous fuels, or other combustible might be employed.

The circulating fans make it possible both to withdraw and to introduce air or gases of any desired character and at high temperature into any desired lengthwise portions of the tunnel. The inner chamber of the circulating fan is always at an absolute pressure less than that of the tunnel by virtue of the friction of the gases as they are being circulated and it is therefore only necessary to connect a supply of the desired gases under a pressure sufficiently high to cause them to flow into the fan chamber to cause such gases to be introduced and thoroughly mixed into the atmosphere of the tunnel. It would, of course, be possible to maintain the tunnel furnace at a low pressure and thereby introduce gases at any point or to maintain it at high pressure and remove gases therefrom at any point, but by the use of a fan operating at high temperature, it is possible to both remove from the tunnel and put back into the same tunnel gases at high temperatures. As in general high temperatures increase the rapidity of chemical action, this feature may be used to advantage in many industries where manufacturing operations are carried on at high temperatures, the making of bricks, as in the construction shown, being merely illustrative of one of its many possible applications. The introduction of inert gases is often of importance, for example, in the heat treatment of colored glasses, pottery, enameling of steel, and other cases where it is desired to produce an inert atmosphere, such for example as might be produced from carbon dioxide as derived from flue gases or other suitable source. In the present embodiment the circulating fans are availed of to cause all or part of the gases to be removed from one portion of the tunnel and that gas and a different mixture of gases to be introduced at other portions. Thus pure heated air is withdrawn from the tunnel by the fan in section $D^1$, part of which is mixed with the combustible gases in the combustion chambers of sections $C^3$, $C^2$ and $C^1$ and reintroduced into the tunnel, and the remainder of which is introduced into the tunnel by the action of the fan in section $B^6$.

Not only does the bypass make possible the transfer of superheated air into the last heating zone section, but it also has the effect of cooling the top of the hot zone, preventing it from overheating and tending to increase the lateral circulation of gases in this portion of the structure, making the temperatures therein more uniform. The air is also further preheated by the hot roof of the hot zone on its passage to the heating zone.

Figures 16, 17, 18, 19, 20:
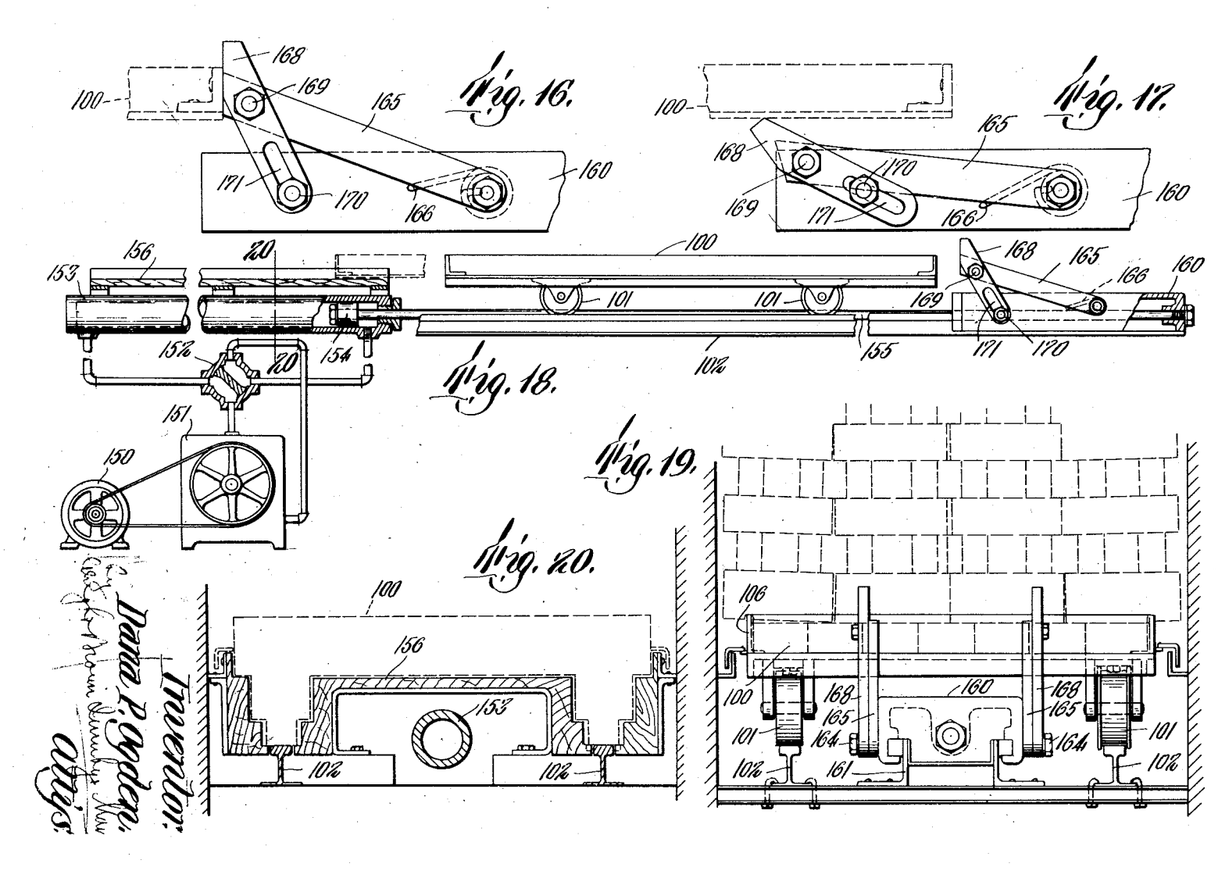
Figure 18 is a somewhat diagrammatic view showing the car pusher mechanism.
Figure 19 is a fragmentary view showing the car and pusher mechanism in end elevation.
Figure 20 is a section on line 20—20 of Figure 18.

A car for supporting the material, which in the present embodiment is brick, is disclosed in Figures 13, 19 and 20 at 100 and comprises a metallic body supported on wheels 101 which are designed to run on rails 102 extending continuously in spaced relation from end to end of the tunnel furnace. Extending inwardly from the tunnel walls on either side somewhat above the rails are channel members 103 presenting upwardly directed flanges 104 spaced from the inner side walls of the tunnel and between which and the walls are depending flanges 105 carried at the sides of the car, this being for the purpose of forming a seal to prevent the car-running gear on the rails from being exposed to the full heat of the gases within the tunnel. The car body has upwardly extending marginal portions 106 forming with the base 107 a pan like structure and in order to protect this body from the heat of the furnace gases a layer of fire brick 108 is placed within the upstanding wall 106, the upper surface of this layer being positioned slightly below the upper edges of the marginal wall. These fire bricks 108 are cemented together to form a complete floor of heat-resistant material for the car on which is designed to be placed supports for the brick. As shown best in Figures 14 and 15, the brick supports comprise fire brick blocks 110, each of which at its upper portion is of reduced thickness, as at 111, in order that when the blocks are positioned side by side channels may be formed between them at their upper portions for the passage of the gases. These blocks are arranged with their larger ends downwardly on the upper surfaces of the bricks 108, as shown in Figure 15, and where the end blocks of each row pass over the projecting edges of the marginal walls 10 they are provided with notches 112 taking over these edges, these notches, however, being of less depth than the height of the projection of the car walls above the bricks 108 so that the end blocks are tilted upwardly at their outer ends as clearly shown in Figure 15. The lower edges of the blocks 110 are beveled as at 115 to provide spaces between them where they rest on the bricks 108. This is for the purpose of permitting dirt or sand which may fall down between the blocks 110 to find lodgment between the blocks so that when they become heated they may be free to expand slightly without crowding each other because of interposed foreign material, which crowding would be liable to disarrange the piles of bricks thereon so that they might scrape against the tunnel walls. In furnaces of this general description it is desirable to allow close clearances only between the material heated and the tunnel walls in order that the gases may act on the material to the best advantage, and consequently refinements of this nature are important. The ends of the blocks 110 overhanging the upstanding walls 106 also furnish further protection for the lower portion of the car from contact by the hot gases. As shown best in Figure 13, the bricks are piled in checker formation on the upper faces of the blocks 110, permitting the gases to come into contact with each of the bricks so that they are treated substantially equally by the gases in the various portions of the length of the tunnel.

The cars are designed to be placed end to end and be moved through the tunnel furnace, the speed of motion depending on the rate of combustion maintained in the combustion furnaces and on the velocity of the gases through the tunnel and should be at such a rate that the bricks emerging from the open end of the tunnel are at only a slightly higher temperature than the incoming air and that the air and gases discharged by the fan 3 shall be only slightly warmer than the bricks entering the first heating zone section B.

In Figures 16 to 18 is indicated mechanism for moving the cars intermittently through the tunnel furnace. As shown in Figure 18 a motor 150 drives a pump 151 which is designed to admit and exhaust fluid under pressure as controlled by a four way valve 152 to opposite ends of a power cylinder 153 in order to effect reciprocation of a piston 154 therein and to which is fixed a piston rod 155. As shown the power cylinder is seated beneath a wooden flooring or enclosure at 156 between the rails 102 in section B¹. At the outer end of the piston rod 155 it is fixed to a carriage 160 mounted for reciprocation on a guide 161 (see Figure 19), this guide also being positioned between the rails 102. To opposite sides of this carriage are pivoted at 164 the lower ends of arms 165, the free ends of these arms being normally pushed and held upwardly by a spring 166 above the upper face of the carriage 160 and in position to engage the end wall of a car, as shown in Figure 16. In order to limit the extent of such upward movement a link 168 is pivoted at 169 to each of the arms 165, each link being also pivotally and slidably connected to the carriage 160 by means of a pivot bolt 170 passing through a slot 171 longitudinally arranged in the lower end of the links and fixed to the carriage. The arms 165 and links 168 may be depressed below the car floor against the tension of the spring 166 as shown in Figure 17, the arm and links thus acting as a dog which on motion of the piston inwardly engages the end of a car as shown in Figures 16 and 19 and moves it along in the tunnel while on motion of the carriage in the opposite direction it is depressed below the car and has no pushing effect thereon. This mechanism is positioned so that the arms 165 and links 168 engage the rear end of the last car inserted in the air lock A and act to push the entire row of cars partly through the tunnel at each actuation thereof, a car being discharged with its ware completely treated and cooled at the open end of the tunnel as a car of untreated material is moved into the tunnel at the opposite end.

Having thus described one embodiment of this invention it should be evident that many changes and modifications might be made therein without departing from its spirit or scope as defined by the appended claims.

I claim:

1. A heat treating mechanism comprising a chamber for containing material to be treated, means for moving the material in one direction through said chamber, means for drawing gases over the material in the opposite direction through said chamber, means at a portion intermediate the length of said chamber for heating the material, and means at either end of said portion for effecting a lateral circulation of the gases.

2. A heat treating mechanism comprising a chamber for containing material to be treated, means for moving the material in one direction through said chamber, means for drawing gases over the material in the opposite direction through said chamber, means at a portion intermediate the length of said chamber for heating the material, means at either end of said portion for effecting a lateral circulation of the gases, and means for conducting gases heated by the hot material beyond said portion in the direction of travel of the material to said chamber on the opposite side of said portion to heat the material approaching said portion.

3. A heat treating mechanism comprising a chamber for containing material to be treated, means for moving the material in one direction through said chamber, means for introducing combustion gases into a portion of said chamber intermediate its ends, means for drawing gases over the material passing beyond said portion to heat such gases and cool the material and for introducing such gases into said chamber on the opposite side of said portion to heat the material therein, means for drawing said gases out of said chamber adjacent to the entrance for the material, and means for producing a lateral circulation of the gases in said chamber on either side of said intermediate portion.

4. A heat treating mechanism comprising a chamber for treating material having intermediate and end portions and a bypass joining said end portions adjacent to said intermediate portion and extending over the top of said intermediate portion, means for supplying hot gases to said intermediate portion, means for passing gases from one to the other end portion through said bypass, and means for conducting gases from said bypass to said hot gas supplying means.

5. A mechanism for vitrifying bricks comprising a chamber for containing material to be treated, means for introducing gases into said chamber at vitrifying temperatures, and means including a fan of high temperature resistant material with which the gases contact for producing a circulation of the vitrifying gases within said chamber.

6. A mechanism for vitrifying bricks, comprising a chamber for containing material to be treated, and means comprising a fan of high temperature resistant material with which the gases contact for withdrawing hot gases at vitrifying temperatures from one portion of said chamber and introducing hot gases into another portion thereof.

7. A heat treating mechanism comprising a chamber for containing material to be treated, a combustion furnace, means including a combustion chamber for conducting the hot products of combustion into said material-containing chamber to heat the material therein, means for drawing air over material which has been so heated to heat the air, and means for conducting the heated air to said combustion chamber.

8. A heat treating mechanism comprising a chamber for containing material to be treated, said chamber having intermediate and end portions, means for carrying material to be treated through said chamber from end to end in one direction, means for heating the material in the intermediate portion of said chamber, means for drawing air through the end portion containing the material heated in said intermediate portion and discharging it into the other end portion to heat the material therein, and means for effecting a lateral circulation of the atmosphere in each of said end portions to effect substantially uniform temperatures at different heights therein.

9. A heat treating mechanism comprising a chamber for containing material to be treated, means for drawing hot gases through said chamber, said chamber having lateral extensions, and a fan in each of said extensions acting to draw gases from the lower portion of said chamber and deliver them to the upper portion thereof.

10. A heat treating mechanism comprising a chamber for containing material to be treated, means for drawing hot gases through said chamber, said chamber having lateral extensions, and a fan in each of said extensions acting to draw gases from one level and to deliver them to another level in said chamber.

11. A heat treating mechanism comprising a chamber for containing material to be treated and having an intermediate and end portions, lateral extensions from said chamber at said portions, a fan in each of the extensions from said end portions acting to take gases from one level in said chamber and deliver them to another level therein, and the extensions from said intermediate portion comprising combustion furnaces having means for directing the hot products of combustion into the intermediate portion of said chamber.

12. A heat treating mechanism comprising a chamber for containing material to be treated and having an intermediate and end portions, lateral extensions from said chamber at said portions, a fan in each of the extensions from said end portions acting to take gases from one level in said chamber and deliver them to another level therein, and the extensions from said intermediate portion comprising combustion furnaces having means for directing the hot products of combustion into the lower part of the intermediate portion of said chamber.

13. A heat treating mechanism comprising a chamber for containing material to be treated and having an intermediate and end portions, lateral extensions from said chamber at said portions, a fan in each of the extensions from said end portions acting to take gases from one level in said chamber and deliver them to another level therein, the extensions from said intermediate portion comprising combustion furnaces having means for directing the hot products of combustion into the lower part of the intermediate portion of said chamber, means for moving the material through said chamber from end to end in one direction, and means for causing a flow of gases through said chamber in the opposite direction.

14. A heat treating mechanism comprising a chamber for containing material to be treated and having an intermediate and end portions, lateral extensions from said chamber at said portions, and a bypass between said end portions extending over said intermediate portion, a fan in each of said extensions from said end portions acting to take gases from the lower portion of said chamber and deliver them to the upper portion thereof, the extensions from said intermediate portion comprising combustion furnaces having means for conducting the hot products of combustion into the intermediate portion of said chamber, means for moving the material through said chamber from end to end, the exit end for the material being open and permitting entrance of air, means for producing a flow of air and other gases through said chamber in a direction opposite to that of the movement of the material, and means for causing gases drawn over the hot material in the final end portion of said chamber to pass through said bypass into the forward end of the other end portion to heat material therein.

15. A heat treating mechanism comprising a chamber for containing material to be treated and having an intermediate and end portions, lateral extensions from said chamber at said portions, and a bypass between said end portions extending over said intermediate portions, a fan in each of said extensions from said end portions acting to take gases from the lower portion of said chamber and deliver them to the upper portion thereof, the extensions from said intermediate portion comprising combustion furnaces having means including combustion chambers for conducting hot products of combustion into the intermediate portion of said chamber, means for moving the material through said chamber from end to end, the exit end for the material being open and permitting entrance of air, means for producing a flow of air and other gases through said chamber in a direction opposite to that of the movement of the material, means for causing gases drawn over the hot material in the final end portion of said chamber to pass through said bypass into the forward end of the other end portion to heat material therein, and means whereby a desired proportion of hot gases in said bypass may be directed to said combustion chambers.

16. A heat treating mechanism comprising a chamber for containing material to be treated, means including a combustion chamber for introducing hot gases into one portion of said material-treating chamber, a bypass connecting portions of said chamber at opposite sides of said introducing means, means for producing a pressure in said bypass greater than in said material-treating chamber, and means permitting some of the gases in said bypass to flow into said combustion chamber.

17. A heat treating mechanism comprising a chamber for containing material to be treated, a lateral extension for said chamber having openings at different levels leading to the interior of said chamber, and means in said extension for drawing gases from said chamber through one of said openings and delivering gases to said chamber through the other of said openings.

18. A heat treating mechanism comprising a chamber for containing material to be treated, an extension at one side of said chamber communicating with the interior of said chamber at its upper and lower portions, said extension having a lateral opening, a fan insertable through said opening into said extension and operable to draw gases from one portion of said chamber and to introduce them at another portion through said communications, said fan having an actuating shaft extending through said opening, means for substantially closing said opening to said shaft, and means at the outer end thereof for rotating said shaft.

19. A heat treating mechanism comprising a chamber for containing material to be treated, an extension at one side of said chamber communicating with the interior of said chamber at its upper and lower portions, said extension having a lateral opening, a fan insertable through said opening into said extension and operable to draw gases from one portion of such chamber and introduce them at another portion through said communications, said fan having an actuating shaft extending through said opening, means for substantially closing said opening to said shaft, means at the outer end thereof for rotating said shaft, and means for cooling said shaft.

20. A heat treating mechanism comprising a chamber for containing material to be treated, an extension at one side of said chamber communicating therewith at a pair of different levels, said extension having a conical opening in one wall thereof, a fan in said extension insertable through said opening and operable to draw gases from said chamber at one of said levels and to force them into said chamber at the other of said levels, said fan having an operating shaft projecting through said opening, and a conical plug having a central perforation for said shaft seated in said opening.

21. A heat treating mechanism comprising a chamber for containing material to be treated, an extension at one side of said chamber communicating therewith at a pair of different levels, said extension having a conical opening in one wall thereof, a fan in said extension insertable through said opening and operable to draw gases from said chamber at one of said levels and to force them into said chamber at the other of said levels, said fan having an operating shaft projecting through said opening, a conical plug having a central perforation for said shaft seated in said opening, and means permitting rotation of said shaft for sealing said plug to said shaft.

22. A heat treating mechanism comprising a chamber for containing material to be treated, an extension at one side of said chamber communicating therewith at a pair of different levels, said extension having a conical opening in one wall thereof, a fan in said extension insertable through said opening and operable to draw gases from said chamber at one of said levels and to force them into said chamber at the other of said levels, said fan having an operating shaft projecting through said opening, a sectional conical plug having a central perforation for said shaft seated in said opening, means for fixing the sections of said plug together, and means permitting rotation of said shaft for sealing said plug to said shaft.

23. A heat treating mechanism comprising a chamber for containing material to be heated, an extension at one side of said chamber communicating therewith at a pair of different levels, said extension having a conical opening in one wall thereof, a fan in said extension insertable through said opening and operable to draw gases from said chamber at one of said levels and to force them into said chamber at the other of said levels, said fan having an operating shaft projecting through said opening, a sectional conical plug having a central perforation for said shaft seated in said opening, means for fixing the sections of said plug together, and a felt sheet fixed to the outer face of said plug and closely engaging said shaft to seal said plug thereto while permitting rotation of said shaft.

24. In a heat treating mechanism, an impeller unit comprising a motor having a hollow shaft, a fan of refractory material fixed to one end of said shaft and means for permitting the circulation of a cooling medium through said shaft.

25. A car for a tunnel furnace having a platform provided with an upstanding margin, heat-resisting material on said platform, and heat-resisting article-supports resting on said material and notched on their lower faces to engage the upper edges of said margin whereby they are held in position.

26. A car for a tunnel furnace having a platform provided with an upstanding margin, heat-resistant material covering said platform and of less thickness than the height of said upstanding margin, and heat-resisting blocks supported on said heat-resisting material notched out to take over said margins, said blocks having their lower edges cut away to provide spaces for foreign material finding its way therebetween.

27. A car for a tunnel furnace having a platform provided with an upstanding margin, heat-resistant material covering said platform and of less thickness than the height of said upstanding margin, and heat-resisting blocks supported on said heat-resisting material notched out to take over said margins, said blocks having their lower edges cut away to provide spaces for foreign material finding its way therebetween, and having narrowed upward portions to provide passages therebetween for the flow of gases.

28. A car for a tunnel furnace having a platform provided with an upstanding margin, heat-resisting material covering said platform and of less thickness than the height of said upstanding margin, and heat-resisting blocks superposed on asid resisting material, certain of said blocks having notches to take over the projecting edges of said margins.

29. A car for a tunnel furnace having a platform provided with an upstanding margin, heat-resisting material covering said platform and of less thickness than the height of said upstanding margin, and heat-resisting blocks superposed on said resisting material, certain of said blocks having notches to take over the projecting edges of said margins, said notches being of less depth than the extent of projection of said margin above said heat-resisting material whereby the upper faces of the blocks at said margin are inclined downwardly toward the center of said car.

30. A car for a tunnel furnace having a platform provided with an upstanding margin, heat-resisting material covering said platform and of less thickness than the height of said upstanding margin, and heat-resisting blocks superposed on said resisting material, certain of said blocks having notches to take over the projecting edges of said margins, said blocks having narrowed upper portions to provide passages therebetween for the flow of gases.

31. A car for a tunnel furnace having a platform, heat resistant material on said platform, and article supporting blocks on said platform having narrowed upper portions to provide passages therebetween for the flow of gases.

32. The method of heating and cooling bodies during their heat treatment in a continuous furnace which consists in causing air and heated gas to follow a helicoid path within the furnace from the outlet and toward the inlet end of the furnace.

33. The method of heating and cooling bodies during their heat treatment in a continuous furnace having temperature changing zones which consists in causing gas and air to circulate in cross sectional planes and advancing helically through the zones.

34. A method of heating bodies during their heat treatment in a continuous furnace which consists in causing air to be directed into the furnace at different points along the furnace and so as to cause the atmosphere within the furnace to follow a helicoid path through the furnace toward the entrance end of the furnace and causing the products of combustion to follow a helicoid path through the furnace towards the entrance end of the furnace and to be drawn off at different points along the furnace.

35. In a continuously operated furnace having temperature raising, firing and cooling zones, means for causing a mixture of air and fuel gas to follow a helicoid path through the zones of the furnace.

36. In a continuously operated furnace having temperature raising and cooling zones, means for causing air to follow a helicoid path through the cooling zone and fuel gas and the products of combustion to follow a helicoid path through the heating zone.

37. In a continuously operated furnace having temperature raising and cooling zones and by-passes communicating with the top and bottom of the furnace, means for producing a flow of the gases in the furnace through the said by-passes to cause the gases in the furnace to follow a helicoid path through the furnace.

38. In a continuously operated furnace having temperature raising and cooling zones and by-passes communicating with the top and bottom of the furnace, the inlet and outlet of each by-pass being one in advance of the other with respect to the movement of the material treated in the furnace, means for producing a flow of air in said by-pass to cause the gases in the furnace to follow a helicoid path through the furnace.

39. A continuously operated furnace having temperature raising and cooling zones and by-passes communicating with the top and bottom of the furnace, means for producing flow of gases of the furnace in said by-passes and having openings in the temperature raising zones for the entrance of burning fuel into the furnace, the inlets and outlets of the said by-passes and the said openings being so disposed as to cause the products of combustion to follow a helicoid path through the furnace.

40. A continuously operated furnace having temperature raising and cooling zones and openings in the temperature raising zone for the entrance of burning fuel in the furnace and so disposed as to cause the products of combustion to follow a helicoid path through the firing zone.

41. In a continuously operated furnace having temperature raising and cooling zones, fans for drawing air into the furnace at different points along the furnace and to cause the air to follow a helicoid path through the furnace, and for causing products of combustion to be drawn from the furnace at different points along the furnace and to cause the heated gases to follow a similar path through the furnace.

42. In a continuously operated furnace having temperature raising and cooling zones, fans for drawing air into the furnace at different points along the furnace and to cause the air to follow a helicoid path through the furnace, the furnace having openings for the entrance of burning fuel gas and so disposed as to cause the air and the products of combustion to follow a helicoid path through the temperature raising zone and fans for causing products of combustion to be drawn from the furnace at different points along the furnace and to cause the heated gases to follow a helicoid path through the furnace.

43. A heat treating mechanism comprising a chamber for containing material to be treated, means for introducing hot gases into said chamber, and means for circulating the hot gases, said means including a removable fan with which the hot gases contact, power means inaccessible to said gases for driving said fan, a drive shaft extending through a wall of said chamber to connect said fan and power means, said wall having a removable portion in contact with said shaft of a size to leave when removed an opening in the wall large enough to permit the removal of said fan therefrom, whereby the entire fan assembly may be removed and replaced during the operation of the heat treating mechanism.

44. A heat treating mechanism comprising a chamber for containing material to be treated, said chamber having lateral extensions connected therewith and an aperture through the wall thereof, a plug normally closing said aperture, and a centrifugal fan in each of said extensions acting to draw gases from one level and to deliver them to another level in said chamber, said fan having a diameter less than that of said aperture to permit removal and replacement during the operation of said mechanism.

45. A heat treating mechanism comprising a chamber for containing the material to be treated, means for introducing hot gases into said chamber, said chamber having lateral extensions, and means for circulating the hot gases in said chamber, said circulating means including centrifugal fans in said lateral extensions.

46. A heat treating mechanism comprising a chamber for containing the material to be treated, means for introducing hot gases into said chamber, and means for withdrawing gases from the lower portion of said chamber and projecting the gases thus withdrawn into the upper portion of the chamber, said withdrawing and projecting means including a lateral extension of said chamber having ducts by which it communicates with the lower and upper portions of said chamber, and a centrifugal fan located in said extension between said ducts.

47. Mechanism for vitrifying bricks, comprising a chamber, means for effecting a flow of gases through said chamber in one general direction, means for maintaining a vitrifying temperature in a portion of said chamber, and means for causing a circulation of gases in said portion of the chamber laterally of said general direction.

In testimony whereof I have affixed my signature.

DANA P. OGDEN.